United States Patent
Zhang et al.

(10) Patent No.: US 7,890,765 B2
(45) Date of Patent: Feb. 15, 2011

(54) GENERATING AND VERIFYING TRUSTED DIGITAL TIME STAMP

(75) Inventors: Jian Zhang, Shanghai (CN); Ling Shao, Beijing (CN); Dong Xie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 12/123,892

(22) Filed: May 20, 2008

(65) Prior Publication Data

US 2008/0288779 A1    Nov. 20, 2008

(51) Int. Cl.
*H04L 9/32* (2006.01)
(52) U.S. Cl. ................................ 713/178; 713/176
(58) Field of Classification Search ............ 713/178
See application file for complete search history.

(56) References Cited

U.S. PATENT DOCUMENTS

| | | | | |
|---|---|---|---|---|
| 5,001,752 | A * | 3/1991 | Fischer ................ | 713/178 |
| 5,781,629 | A * | 7/1998 | Haber et al. ............ | 713/177 |
| 6,311,276 | B1 * | 10/2001 | Connery et al. ........... | 726/2 |
| 6,546,405 | B2 * | 4/2003 | Gupta et al. ............ | 715/233 |
| 6,587,945 | B1 * | 7/2003 | Pasieka ................. | 713/176 |
| 2002/0120851 | A1 | 8/2002 | Clarke | |
| 2002/0169721 | A1 * | 11/2002 | Cooley et al. ............ | 705/51 |

OTHER PUBLICATIONS

Panabiere, "NTP Protocole", Technical Revue #63, Dec. 2002, pp. 1-2.*
Adams et al., "RFC 3161", IETF, Aug. 2001, pp. 1-34.*
C. Adams, P. Cain, D. Pinkas, R. Zuccherato, "Internet X.509 Public Key Infrastructure Time-Stamp Protocol (TSP)," Aug. 2001, pp. 1-26.

* cited by examiner

*Primary Examiner*—Kambiz Zand
*Assistant Examiner*—William S Powers
(74) *Attorney, Agent, or Firm*—Michael J. Buchenhorner; Vazken Alexanian

(57) ABSTRACT

Methods, apparatus and systems for generating a trusted digital time stamp as well as a public time source. It includes, an apparatus for receiving and recording public time information and a method for verifying a digital time stamp. A method for generating a trusted digital time stamp includes: obtaining a first time information and a corresponding random code from a public time source; and generating a digital time stamp using a first time information and random code. A method for verifying a digital time stamp includes: recording time information and corresponding random codes transmitted by a public time source; retrieving time information and a random code contained in the time stamp; and comparing a retrieved random code from the time stamp with one of the recorded random codes that corresponds to a time information in the time stamp, if they are consistent, the time stamp is determined to be trusted, otherwise the time stamp is determined to be not trusted.

4 Claims, 7 Drawing Sheets

2

GENERATING AND VERIFYING TRUSTED DIGITAL TIME STAMP

TECHNICAL FIELD

The present invention relates to a data processing technique. More particularly, it relates to the technique of trusted digital time stamps.

TECHNICAL BACKGROUND

With the development of computer networks and the Internet, digital time stamp has been more and more important in the digital world, especially, for the electronic business activities. Digital time stamp has become an important evidence in transactions and security monitoring.

The method for generating a digital time stamp, in the prior art, comprises: first extracting a digest from the data (or file) that needs a time stamp and then attaching current time information (date and time) to the digest and making a digital signature (encryption).

Further, since the terminal computing device or the equipment of a transaction party, i.e. the local device, is usually not trusted due to technical or commercial reasons, the method for generating a trusted digital time stamp in the prior art comprises: as shown in FIG. 1, locally extracting a digest from the data (or file) that need a time stamp; next, sending the digest to a trusted digital time stamp server (DTS); then, the digest is attached with time information about the time of receiving the digest and a digital signature by the DTS and returned back as a trusted digital time stamp.

Thus, each time when generating a digital time stamp, it is necessary to communicate with a digital time stamp server. In this respect, it has been proposed to use a reliably synchronized local clock for generating a time stamp. For example, United States Patent No. US2002/0056042 disclosed such a method and system. But, the system's complexity is increased for the reliable synchronization of a local clock. United States Patent No. US2002/0056042 is incorporated herein in entirety for all purposes.

SUMMARY OF THE INVENTION

In order to solve the above-described problems, according to one aspect of the present invention, there is provided a method for generating a trusted digital time stamp, comprising: obtaining a first time information and a corresponding random code from a public time source; and generating a digital time stamp by using the obtained first time information and random code.

According to another aspect of the present invention, there is provided an apparatus for generating a local trusted digital time stamp, comprising: a time information receiver for receiving time information and corresponding random code from a public time source; a digest calculation unit for calculating a digest based on the data desired to be attached a time stamp; and a digital signature synthesizing unit for combining the digest calculated by the digest calculation unit and the time information and random code received by the time information receiver and appending a digital signature to it.

According to another aspect of the present invention, there is provided a public time source for continuously providing time information representing the current time and corresponding random codes.

According to another aspect of the present invention, there is provided an apparatus for receiving and recording public time information, for continuously receiving and recording time information and corresponding random codes coming from a public time source.

According to another aspect of the present invention, there is provided a system for generating a trusted digital time stamp.

According to another aspect of the present invention, there is provided a method for verifying a digital time stamp.

BRIEF DESCRIPTION OF THE DRAWINGS

The above and other aspects, features, and advantages of the present invention will become more apparent from the following detailed description when taken in conjunction with the accompanying drawings, in which.

DETAILED DESCRIPTION OF THE INVENTION

The present invention, provides method and systems for generating a trusted digital time stamp. In an example embodiment, a method, comprises: obtaining a first time information and a corresponding random code from a public time source; and generating a digital time stamp by using the obtained first time information and random code.

The present invention also provides an apparatus for generating a local trusted digital time stamp. In an example embodiment, the apparatus comprises: a time information receiver for receiving time information and corresponding random code from a public time source; a digest calculation unit for calculating a digest based on the data desired to be attached a time stamp; and a digital signature synthesizing unit for combining the digest calculated by the digest calculation unit and the time information and random code received by the time information receiver and appending a digital signature to it.

According to another aspect of the present invention, there is provided a public time source for continuously providing time information representing the current time and corresponding random codes.

Preferably, the public time source comprises: a clock; a random code generator for continuously generating random code; and a time information transmission means for transmitting the current time of the clock and the random code newly generated by the random code generator.

The present invention, there is provided an apparatus for receiving and recording public time information, for continuously receiving and recording time information and corresponding random codes coming from a public time source. Preferably, the apparatus for receiving and recording public time information comprises: a time information receiving means for receiving the time information and corresponding random codes from the public time source; and a time information recording means for recording the received time information and random codes.

The present invention, also provides a system for generating a trusted digital time stamp. In an example embodiment, the system comprises the above-described apparatus for generating a local trusted digital time stamp and the above-described public time source.

The present invention also provides a method for verifying a digital time stamp, comprising: recording time information and corresponding random codes transmitted by a public time source; retrieving time information and a random code contained in the time stamp; and comparing the random code retrieved from the time stamp with recorded random code corresponding to the time information in the time stamp, if they are the same, the time stamp is determined to be trusted, otherwise the time stamp is determined to be not trusted.

Next, detailed description will be given to the preferred embodiments of the present invention with reference to the drawings.

Method for Generating a Trusted Digital Time Stamp

Figure 1:
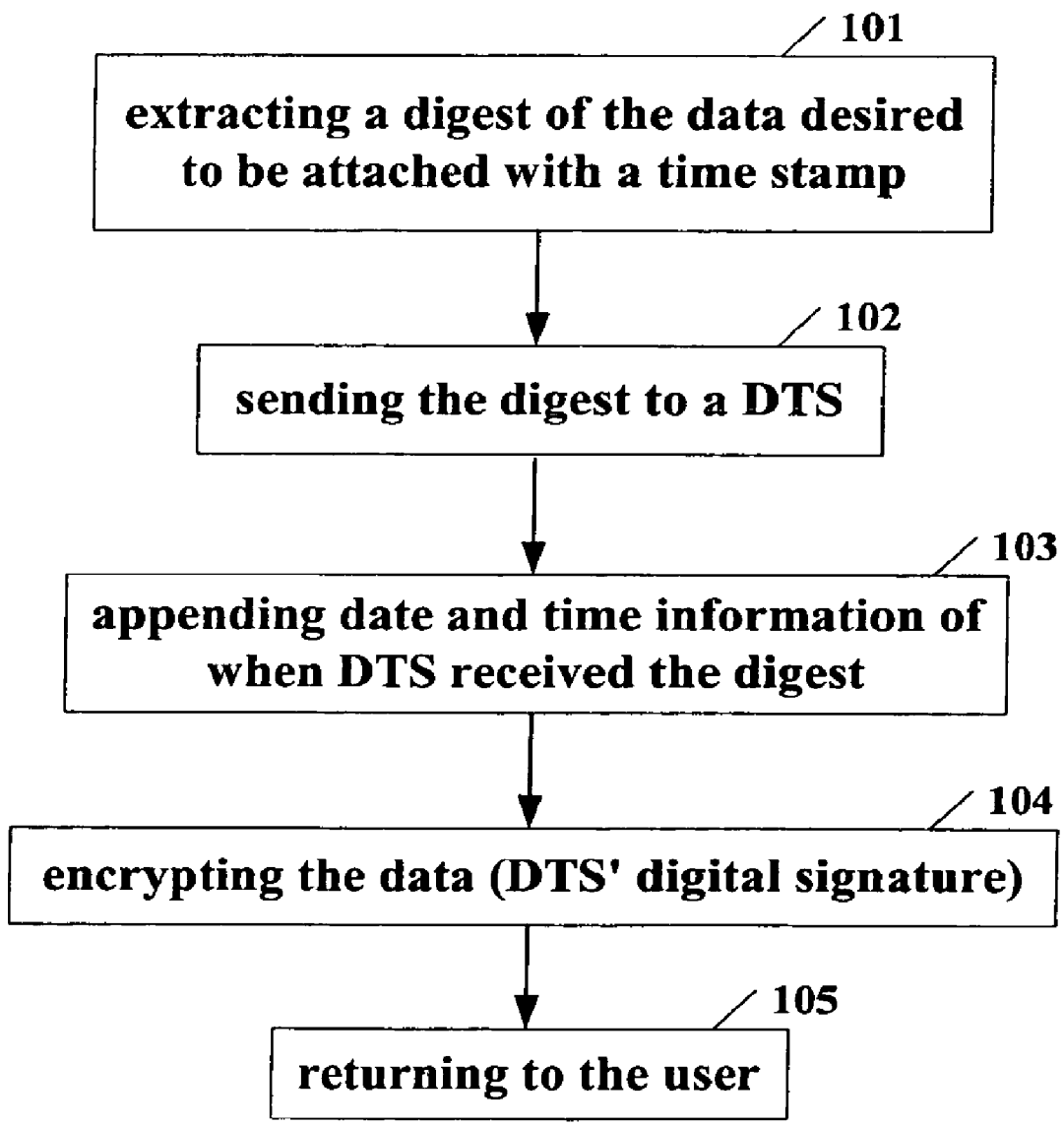
FIG. 1 is a flowchart showing a method for generating a trusted digital time stamp in the prior art.
Figure 2:
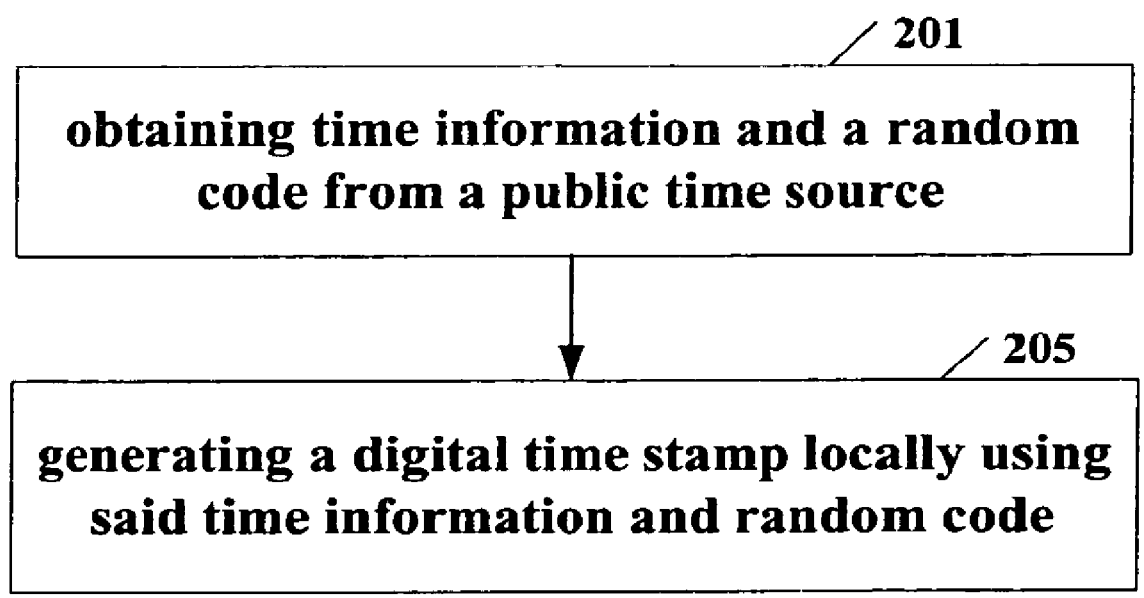
FIG. 2 is a flowchart showing a method for generating a trusted digital time stamp according to an embodiment of the present invention.

The present invention provides a method for generating a trusted digital time stamp. FIG. 2 is a flowchart showing a method for generating a trusted digital time stamp according to an embodiment of the present invention. As shown in FIG. 2, first at Step 201, time information and a corresponding random code are received from a public time source. The public time source of the present embodiment can continuously generate accurate time information and random codes corresponding to each time, and transmit them to a local apparatus that needs to generate a time stamp (later described apparatus for generating a local trusted time stamp), wherein the random code may be a random number randomly generated, a detailed description will be made for the public time source later.

Next, at Step 205, a digital time stamp is locally generated by means of the above-described time information and corresponding random code. Particularly, the time information and corresponding random code locally received is attached to the data desired to be attached with a time stamp, and a digital signature is made (encryption).

Because the time stamp, generated by the method of the present embodiment, contains a corresponding unpredictable random code and time information, it can be reliably proved that the time stamp is generated after the time indicated by the time information. This is because that it is impossible to predict the content of the random code before the time indicated by the time information. Thus, using the present embodiment, it is possible to generate trusted digital time stamp locally without a need of a local clock and local time synchronization.

Figure 3:
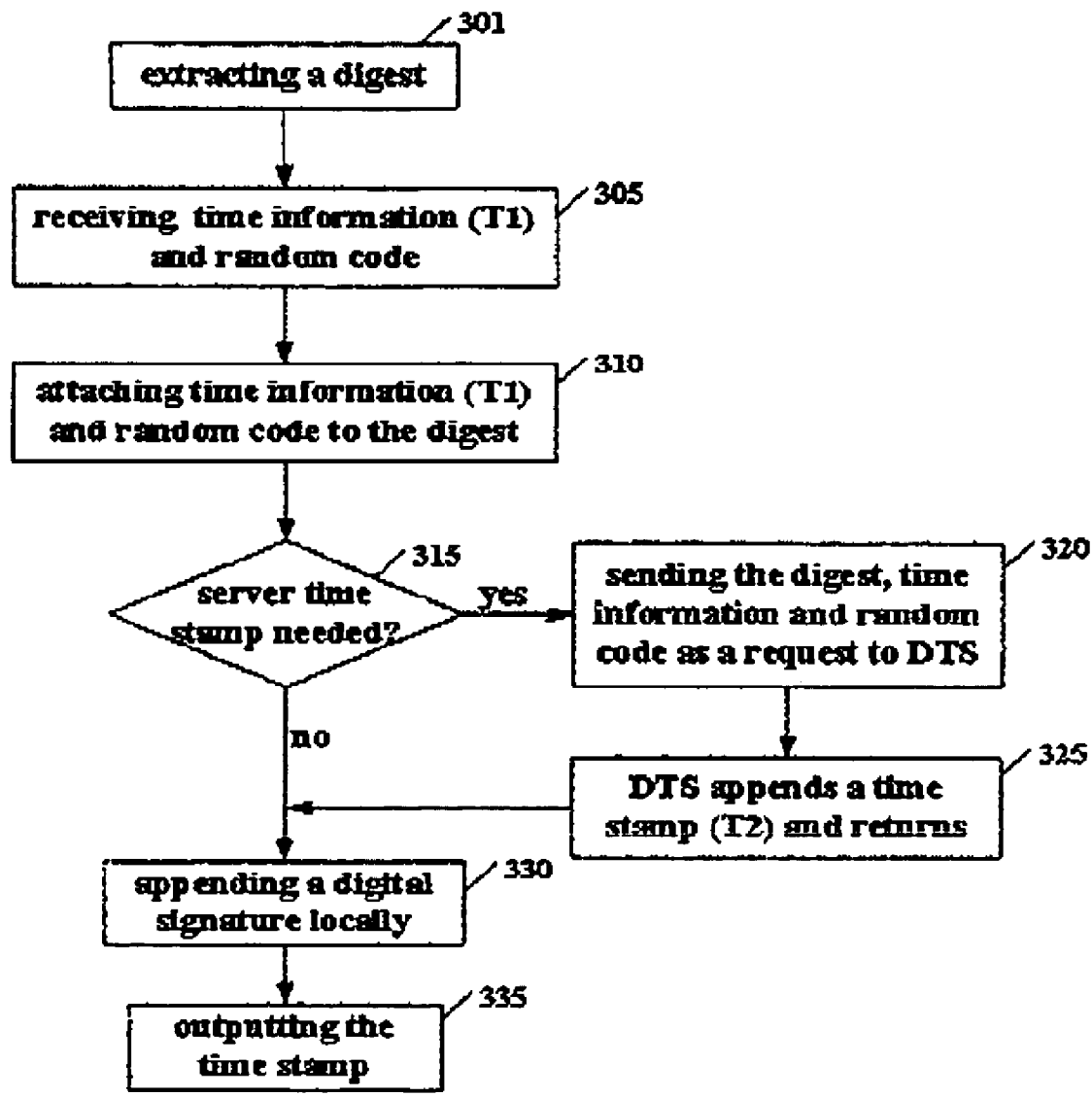
FIG. 3 is a detailed flowchart showing a method for generating a trusted digital time stamp according to an embodiment of the present invention.

Further, FIG. 3 is a detailed flowchart of a method for generating a trusted digital time stamp according to another embodiment of the present invention. As shown in FIG. 3, first at Step 301, a digest is extracted from the data (file) desired to be appended with a time stamp. As known by those skilled in the art, various digital digest extraction methods, such as Secure Hash Algorithm (SHA) or MD5 (MD Standards for Message Digest), may be used for extracting a digest. The present invention has no special limitation to the way of extracting a digest and the format of an extracted digest.

Next, at step 305, time information (T1) and a corresponding random code is received from a public time source. As mentioned above, the public time source continuously generates accurate time information and random codes corresponding to the time information respectively, and transmits them to local devices that need to generate time stamp, wherein the random code can be a randomly generated random number.

Next, at step 310, the received time information (T1) and the corresponding random code is attached to the digest.

Next, at step 315, a determination is made as to whether a server time stamp is needed, if so, the process proceeds to step 320, otherwise to step 330.

At step 320, the digest attached with the time information and the random code is sent to the time stamp server as a request, requesting the server to generate a server time stamp. Here, the process of generating a server time stamp is the same as the method for generating a server time stamp in the prior art. For example, usually, after having received the request, the time stamp server will attach time information (T2) that represents the receiving time to the request and make a digital signature, and return it to the requesting party as a response at step 325.

Then, at step 330, a digital signature is appended locally and at step 335 the generated trusted digital time stamp is outputted.

As shown in the above description, it can be accurately and reliably proved in the present embodiment that an event (the generation of a digital time stamp) occurred between the time T1 and the time T2 through a combination of time information (T1) transmitted by a public time source and time information (T2) attached by the time stamp server, which indicates the receipt of the request.

In the present embodiment, there is no special limitation to the way of making a digital signature. A key pair or other ways may be used, as long as tampering can be prevented. In addition, in the present embodiment, there is also no special limitation to the way in which the time stamp server generates a server time stamp.

Furthermore, in the present embodiment, although the receipt of the time information (T1) and the random code from a public time source (Step 305) is after the extraction of the digest (Step 301) as shown in FIG. 3, it is not limited to this way, for instance, step 305 may be performed before the extraction of the digest or in parallel with other steps of the process. In other words, in an apparatus for generating a local digital time stamp (detailed description will be given later), the time information (T1) and the corresponding random codes may be continuously received from a public time source in parallel for using when needed.

Alternatively, when a digital signature from a time stamp server is considered to be enough, step 330 in FIG. 3, i.e. locally appending a digital signature, may also be omitted.

Public Time Source

Figure 5:
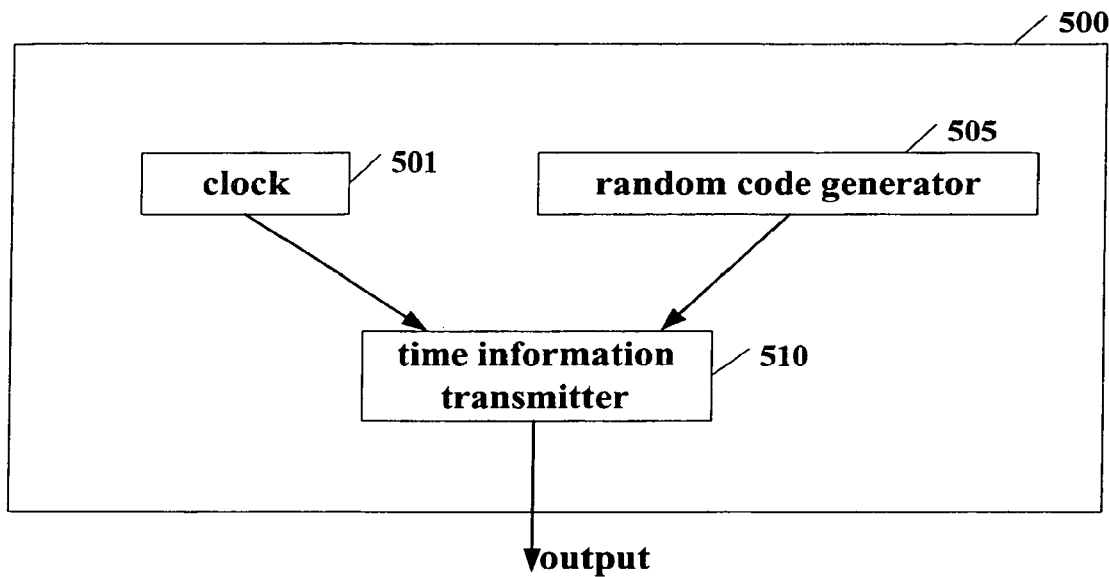
FIG. 5 is a block diagram illustrating the structure of a public time source according to an embodiment of the present invention.

Under the same inventive concept, the present invention further provides a public time source for generating a trusted digital time stamp. FIG. 5 is a block diagram illustrating the structure of a public time source according to an embodiment of the present invention. As shown in FIG. 5, the public time source 500 of the present embodiment comprises: a clock 501; a random code generator 505 for continuously generating random codes; and a time information transmission means 510 for transmitting the time information of the clock's current time and the random code that is newly generated by the random code generator and corresponding to the time information.

Preferably, the public time source 500 of the present embodiment may be implemented as part of a time service system, for instance, as a time server of a network time service system, a time service satellite of a satellite time service system or a time signal transmitting means of a land wireless time service system. Correspondingly, the time information transmission means 510 needs to adopt different transmission medium, such as radio, microwave, network and so on, these may be known to those skilled in the art. However, differing from traditional time service systems, the public time source 500 of the present embodiment, in addition to the current time information, transmits a random code in correspondence with the current time information at each time of transmitting. The random code will be used by an apparatus for generating a local trusted digital time stamp (described later) to generate a digital time stamp.

Preferable, the random code generator 505 of the public time source 500 is a real random number generator, such as a random number generating device using a thermoelectric resistance, rather than a pseudo random number generating means implemented by using a program. In this way, the unpredictability of the random codes may be better ensured, so that the reliability of the generated time stamp may be ensured.

Besides, the components of the public time source 500 shown in FIG. 5 may be separated physically at different locations and implement the whole function of the public time source 500 operationally; for instance, the clock 501 and the time information transmission means 510 may be located separately in a wireless time service system and the clock 501 may be a clock system comprising a plurality of synchronized clocks, such as a UTC (Coordinated Universal Time) system.

Apparatus for Generating a Local Trusted Digital Time Stamp

Figure 4:
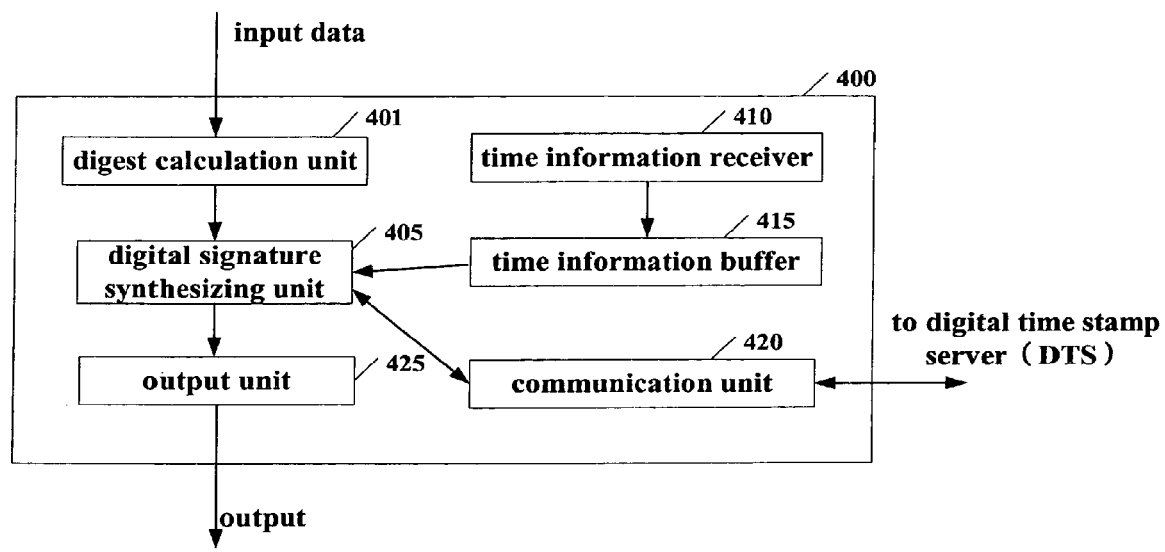
FIG. 4 is a block diagram illustrating a structure of an apparatus for generating a local trusted digital time stamp according to an embodiment of the present invention.

Under the same inventive concept, the present invention further provides an apparatus for generating a local trusted digital time stamp. FIG. 4 is a block diagram illustrating the structure of an apparatus for generating a trusted digital time stamp according to an embodiment of the present invention. As shown in FIG. 4, the apparatus for generating a local trusted digital time stamp of the present embodiment 400 comprises: a time information receiver 410 for receiving the time information and corresponding random code from a public time source (such as the above-described public time source 500); a digest calculation unit 401 for calculating a digest based on the input data (file) desired to be attached with a time stamp, the method for calculating a digest has been described above; and a digital signature synthesizing unit 405 for combining the digest calculated by the digest calculation unit 401 and the time information and the random code received by the time information receiver 410 and appending a digital signature.

Here, the digest calculation unit 401 and the digital signature synthesizing unit 405 constitute a local time stamp generation unit for generating a digital time stamp by using time information and random code obtained by the time information receiver 410.

Furthermore, the apparatus for generating a local trusted digital time stamp 400 further includes a time information buffer 415 for temporarily saving the time information and corresponding random codes received from the public time source; a communication unit 420 for communicating with a time stamp server (DTS), sending a request to the time stamp server for time stamp service and receiving a response from the time stamp server; and an output unit 425 for outputting the generated digital time stamp.

By means of an apparatus for generating a local trusted digital time stamp according to the present embodiment, the above-described method for generating a trusted digital time stamp can be implemented. Particularly, the digest calculation unit 401 extracts a digest from the data (file) desired to be attached with a time stamp; the time information receiver 410 receives time information (T1) and a corresponding random code from a public time source via a transmission medium used by the time information transmission means 510; the digital signature synthesizing unit 405 attaches the received time information (T1) and the random code to the digest and appends a digital signature; and the output unit 425 outputs the generated time stamp. Furthermore, if required, the communication unit 420 may send the digest attached with the time information and the random code to a time stamp server as a request and receives a returned server time stamp from the time stamp server, then the server time stamp is returned to the digital signature synthesizing unit 405. And, a local signature or local time stamp may be attached to the server time stamp coming from the time stamp server, using the above mechanism, so as to further enhance the reliability.

Preferably, in the present embodiment, the time information receiver 410 may continuously receive time information and corresponding random codes from the public time source 500, and temporarily save them in the time information buffer 415 for use whenever needed.

Alternatively, if there is no need for a server time stamp, the communication unit of the present embodiment may be omitted.

Apparatus for Receiving and Recording Public Time Information

Figure 6:
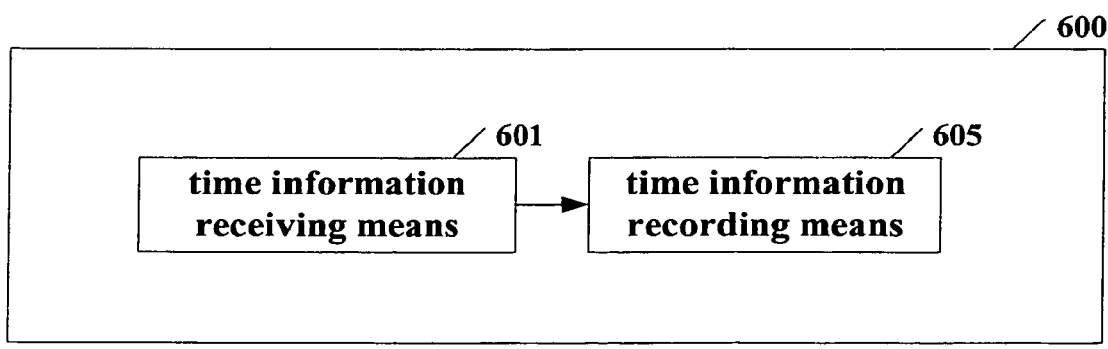
FIG. 6 is a block diagram illustrating a structure of an apparatus for receiving and recording public time information according to an embodiment of the present invention.

Under the same inventive concept, the present invention provides an apparatus for receiving and recording public time information. FIG. 6 is a block diagram illustrating the structure of an apparatus for receiving and recording public time information according to an embodiment of the present invention. As shown in FIG. 6, the apparatus for receiving and recording public time information 600 of the present embodiment includes: a time information receiving means 601 for receiving time information and corresponding random codes from the public time source 500 via a transmission medium used by the time information transmission means of the public time source 500; and a time information recording means 605 for recording the time information and random codes received by the time information receiving means 601.

By using the apparatus for receiving and recording public time information 600, the time information and the corresponding random codes transmitted by the public time source 500 may be recorded and saved for the public to verify a digital time stamp generated by the present invention. Preferably, the apparatus for receiving and recording public time information 600 or the time information and the corresponding random codes recorded by the apparatus for receiving and recording public time information 600 may be implemented on a network server that can be publicly accessed, so that the public can look up them to verify the digital time stamps.

Method for Verifying a Digital Time Stamp

Figure 7:
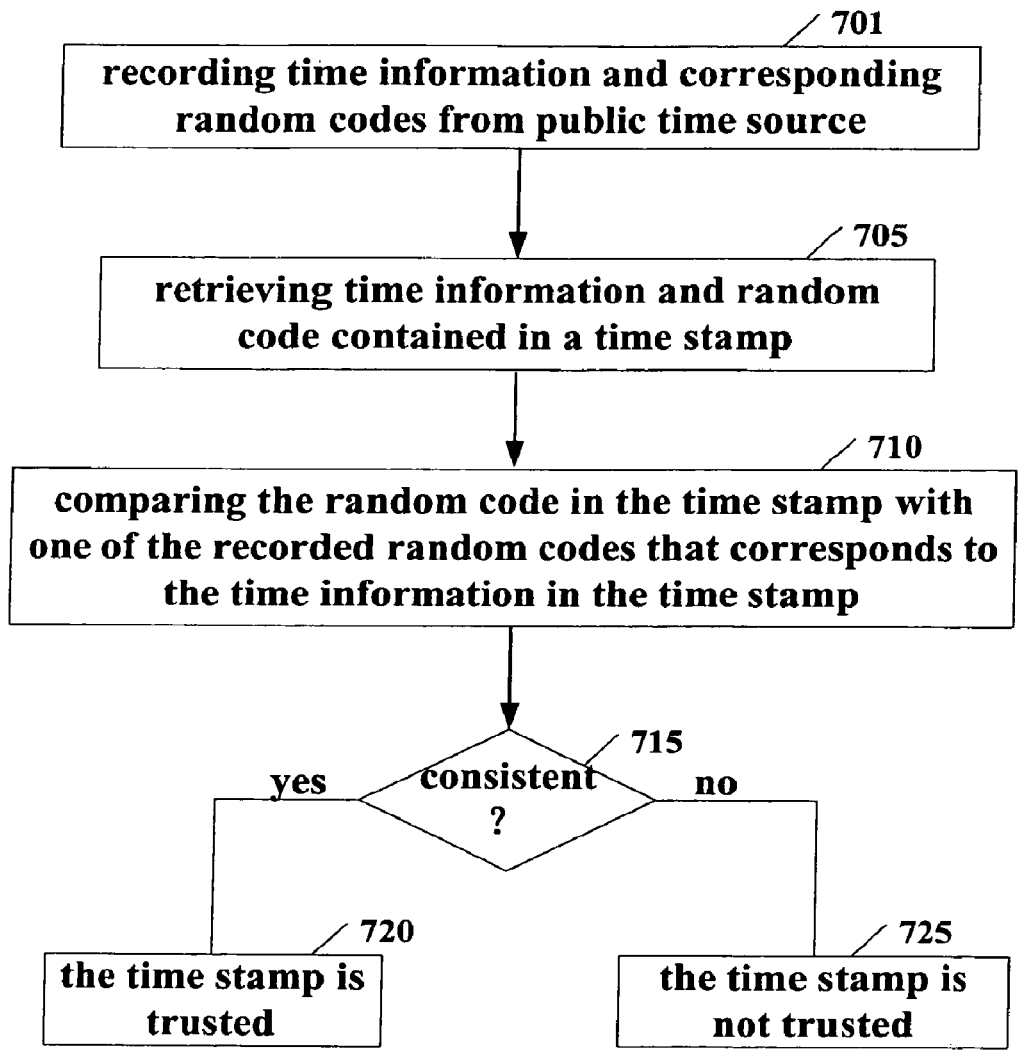
FIG. 7 is a flowchart showing a method for verifying a digital time stamp according to an embodiment of the present invention.

Under the same inventive concept, the present invention further provides a method for verifying a digital time stamp. FIG. 7 is a flowchart showing the method for verifying a digital time stamp according to an embodiment of the present invention. As shown in FIG. 7, first at step 701, time information and the corresponding random codes transmitted by a public time source are recorded. Particularly, this step may be carried out by the above-described apparatus for receiving and recording public time information 600, and this step may be executed in parallel with other steps of the method of the present embodiment, for instance, being executed by the above-described apparatus for recording public time information.

Next, at step 705, the time information and the random code contained in the time stamp to be verified are retrieved. Particularly, for instance, the time stamp is decrypted by a common key and the time information and the random code contained in the time stamp are retrieved. Of course, if the way of making a digital signature is different, this step also may vary, to which this the present invention is not limited.

Next, at step 710, the random code in the time stamp is compared with the random code recorded by the apparatus for receiving and recording public time information 600, which should correspond to the time information in the time stamp; and at step 715, a determination is made as to whether these two random codes correspond with each other or not, if they are the same, the time stamp is determined to be trusted (step 720), otherwise the time stamp is determined to be untrusted, being tampered or faked (step 725).

By using the method of the present embodiment, the digital time stamp generated by the above described method can be verified reliably, through checking the digital signature and comparing the random code in the digital time stamp with the random code generated by the public time source at that time. Particularly, only when the local digital signature is checked to be legal, and the correspondence relation between the time and the random code in the time stamp is correct, the time stamp is determined to be trusted, otherwise it is determined to be not trusted.

Furthermore, if the digital time stamp to be verified further includes a digital signature of a time stamp server, for instance, a time stamp server was requested to append a server time stamp during the generation, only when the server's digital signature is also legal, the digital time stamp is determined to be trusted, otherwise it is determined to be not trusted. Here, the present invention has no special limitation to the way for checking whether the server's digital signature is legal or not, as long as corresponding to the way for appending the time stamp used by the server.

System for Generating a Trusted Digital Time Stamp

Figure 8:
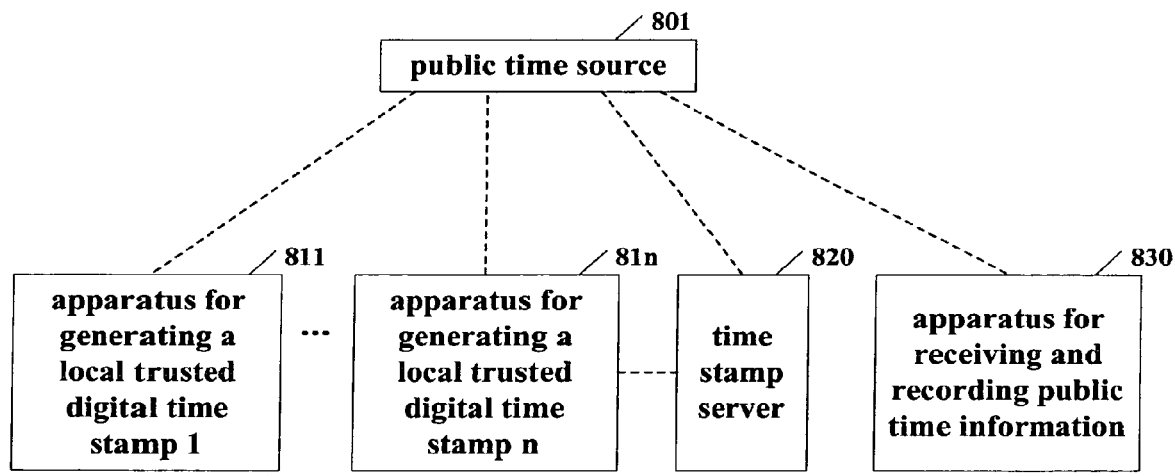
FIG. 8 is a sketch diagram illustrating a structure of a system for generating a trusted digital time stamp according to an embodiment of the present invention.

Under the same inventive concept, the present invention further provides a system for generating a trusted digital time stamp. FIG. 8 is a sketch diagram illustrating the structure of a system for generating a trusted digital time stamp according to an embodiment of the present invention. As shown in FIG. 8, the system includes: the above described public time source 801, apparatus for generating a local trusted time stamp 811-81$n$, time stamp server (DTS) 820 and apparatus for receiving and recording public time information 830. It can be appreciated from the above description that, in order to generate a trusted digital time stamp, the system should includes at least one public time source 801 and one apparatus for generating a trusted digital time stamp 811.

Above described apparatus for generating a local trusted digital time stamp, the public time source, the apparatus for receiving and recording public time information of the present invention as well as their respective components may be implemented in the form of hardware and software, and may be incorporate with other apparatus according to requirements, for example, the apparatus for generating a local trusted digital time stamp of the present invention may be implemented on a personal computer, a notebook computer, a palmtop computer, a PDA, a digital camera, a digital video recorder, a mobile telephone, a word processor and other devices with computing functionality.

Though a method, apparatus and system for generating a trusted digital time stamp as well as a public time source, an apparatus for receiving and recording public time information and a method for verifying a digital time stamp of the present invention have been described in details with some exemplary embodiments, these embodiments are not exhaustive. Those skilled in the art may make various variations and modifications within the spirit and scope of the present invention. Therefore, the present invention is not limited to these embodiments, rather, the scope of the present invention is only defined by the appended claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means, in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for verifying a digital time stamp, comprising:
    recording time information and corresponding random codes transmitted by a public time source;
    retrieving time information and a random code contained in the time stamp; and
    comparing said retrieved random code from the time stamp with one of the recorded random codes that corresponds to said time information in the time stamp, if they are consistent, the time stamp is determined to be trusted, otherwise the time stamp is determined to be not trusted.

2. The method for verifying a digital time stamp according to claim 1, wherein said time stamp further includes a local digital signature;
    said method further comprises:
        checking whether the local digital signature of the time stamp is legal or not, and determining that the time stamp is not trusted if the local digital signature of said time stamp is not legal.

3. The method for verifying a digital time stamp according to claim 1, wherein said time stamp further includes a time stamp server's digital signature;
    said method further comprises:
        checking whether said time stamp server's digital signature is legal or not, and determining that the time stamp is not trusted if said time stamp server's digital signature is not legal.

4. An article of manufacture comprising a non-transitory computer usable medium having computer readable program code embodied therein for causing verification of a digital time stamp, the computer readable program code in said article of manufacture comprising computer readable program code causing a computer to effect the steps of claim 1.

* * * * *